United States Patent Office 3,005,245
Patented Oct. 24, 1961

3,005,245
METHOD FOR MAKING POLYMERIC
FOUNDRY CORE OR MOLD
Clinton B. Howard, Texas City, Tex., assignor to Monsanto Chemical Company, St. Louis, Mo., a corporation of Delaware
No Drawing. Filed Jan. 26, 1959, Ser. No. 788,724
6 Claims. (Cl. 22—193)

This invention relates to novel foundry core and mold compositions and their fabrication. More particularly, it relates to novel binding materials for use in foundry core and mold compositions and to methods for making sand cores and molds therefrom.

Numerous materials have been suggested as binders in the manufacture of sand cores and molds, as for example, cereal products such as starch, dextrins, flours, sugars, etc., linseed oil, alkyd resins, urea resins and phenolic resins. However, certain shortcomings attend the use of such binders. The cereal product binders produce cores and molds having good green strength but they become rancid on standing and also generate excessive quantities of gas on "burn out," thereby resulting in castings having rough and porous surfaces as well as internal gas holes. The linseed oil binders give poor green strength and low baked strength. The alkyd, urea and phenolic resin binders likewise produce cores and molds of poor green strength. Moreover, these latter binders do not "burn out" completely, especially at the low casting temperatures employed in conjunction with the casting of non-ferrous metals. Therefore, cores prepared therefrom do not "collapse" readily during casting to avoid "hot tearing" and permit ready separation of the finished casting from the mold.

It is an object of this invention to provide novel foundry core and mold compositions.

Another object is the provision of novel binding materials for use in foundry core and mold compositions.

A further object is the provision of a universal binding material capable of producing foundry cores and molds of good green strength and bake strength but which "burn out" at the relatively low casting temperatures of non-ferrous metals without generating excessive quantities of gas.

These and other objects are attained by incorporating into a foundry sand a thermosettable mixture of a polyhydric alcohol and a water-soluble copolymer of an ethylenically unsaturated dicarboxylic acid or carboxylic acid-amide and an akylene compound containing from 2-4 carbon atoms.

The following examples are given in illustration of the invention and are not intended as limitations thereon. Where parts are mentioned they are parts by weight.

*Example I*

An ethylene-maleic anhydride copolymer having a specific viscosity of 0.6 (as measured at 25° C. in a 1% by weight solution of copolymer dissolved in dimethylformamide) is dissolved and hydrolyzed in water and subsequently reacted with an excess of gaseous ammonia to form the ammonium salt of an ethylene-maleamic acid copolymer. Thirty parts of a 25% solids by weight aqueous solution of this copolymer salt, 2.5 parts of glycerine, 1500 parts of #60 Ottawa sand and 60 parts of water are intimately mixed in a conventional muller for about 2 minutes. Then 6 parts of a release agent comprised of a mixture of 1 part of oleic acid and 7 parts of kerosene are added and mulling is continued for about another minute. A green core is made by pouring a portion of the molding composition into a corebox and tamping with 3 blows of a Dietert rammer. The green core is found to have 0.6 p.s.i. green compressive strength. Standard tensile strength test bars of 1.0 square inch cross-sectional area at the point of break are prepared by pouring portions of the molding composition into a steel mold and baking in a hot air oven at 400° C. for 30 minutes. The steel mold employed is shaped to form symmetrical test bars which in the elevated view resemble hour glasses nipped into a 1-inch width and which are a uniform 1-inch in depth. The tensile strength of these test bars averages about 260 p.s.i.

*Example II*

Example I is repeated, the tensile strength test bars being cured by dielectric heating using 500 milliamperes for 20 seconds. The tensile strength of these test bars averages about 220 p.s.i.

*Example III*

An ethylene-maleic anhydride copolymer having a specific viscosity of 0.3 (as measured at 25° C. in a 1% by weight solution of copolymer dissolved in dimethylformamide) is dissolved and hydrolyzed in water and subsequently partially neutralized with a 28% aqueous ammonia solution to form the half-ammonium salt thereof. Sixty parts of a 25% solids by weight aqueous solution of this copolymer salt, 1.5 parts of a polyethylene glycol having a degree of polymerization of 9, 1500 parts of #60 Ottawa sand and 40 parts of water are intimately mixed in a conventional muller for about 2 minutes. Then 6 parts of a release agent comprised of a mixture of 1 part of oleic acid and 7 parts of kerosene are added and mulling is continued for about another minute. A green core is made by pouring a portion of the molding composition into a corebox and tamping with 3 blows of a Dietert rammer. The green core is found to have 0.8 p.s.i. green compressive strength. Standard tensile strength test bars of 1.0 square inch cross-sectional area at the point of break are prepared by pouring portions of the molding composition into a steel mold and baking in a hot air oven at 400° C. for 30 minutes. The steel mold employed is shaped to form symmetrical test bars which in the elevated view resemble hour glasses nipped into a 1-inch width and which are a uniform 1-inch in depth. The tensile strength of these test bars averages about 350 p.s.i.

*Example IV*

An ethylene-maleic anhydride copolymer having a specific viscosity of 1.0 (as measured at 25° C. in a 1% by weight solution of copolymer dissolved in dimethylformamide) is dissolved and hydrolyzed in water. Ten parts of a 25% solids by weight aqueous solution of this acid copolymer, 1 part of glycerine, 1500 parts of #60 Ottawa sand and 80 parts of water are intimately mixed in a conventional muller for about 2 minutes. Then 6 parts of a release agent comprised of a mixture of 1 part of oleic acid and 7 parts of kerosene are added and mulling is continued for about another minute. A green core is made by pouring a portion of the molding composition into a corebox and tamping with 3 blows of a Dietert rammer. The green core is found to have 0.5 p.s.i. green compressive strength. Standard tensile strength test bars of 1.0 square inch cross-sectional area at the point of break are prepared by pouring portions of the molding composition into a steel mold and baking in a hot air oven at 400° C. for 30 minutes. The steel mold employed is shaped to form symmetrical test bars which in the elevated view resemble hour glasses nipped into a 1-inch width and which are a uniform 1-inch in depth. The tensile strength of these test bars averages about 160 p.s.i.

The water-soluble copolymers employed in this invention are copolymers of an ethylenically unsaturated dicarboxylic acid or carboxylic acid-amide and an alkylene monomer containing from 2–4 carbon atoms and the ammonium salts thereof. The ethylenically unsaturated dicarboxylic acid or carboxylic acid-amide component may be maleic acid, fumaric acid, maleamic acid or fumaramic acid, or a mixture thereof. The alkylene monomer may be ethylene, propylene, isobutylene, etc. or mixtures thereof. Therefore, examples of suitable water-soluble copolymers include ethylene-maleic acid, ethylene-maleamic acid, ethylene-fumaric acid, propylene-maleic acid, propylene-fumaramic acid, isobutylene-maleic acid, isobutylene-maleamic acid, etc. and mixtures thereof. However, it is preferred to employ the ammonium salts, either partial or complete, of these copolymers. The preferred water-soluble copolymers of this invention are the ammonium salts of ethylene-maleic acid and ethylene-maleamic acid copolymers.

The water-soluble copolymers employed should have a molecular weight equivalent to the molecular weight of an ethylene-maleic anhydride copolymer having a specific viscosity of from about 0.1–3.0 as measured at 25° C. on a 1% by weight solution of the ethylene-maleic anhydride copolymer dissolved in dimethylformamide. However those copolymers having a molecular weight equivalent to that of an ethylene-maleic anhydride copolymer having a specific viscosity of from about 0.4–1.2 provide cured molds having the highest tensile strength. Those copolymers comparable to an ethylene-maleic anhydride specific viscosity of about 0.6 appear to be optimum.

These copolymers may be prepared by various methods known in the art, e.g., by the method taught by Voss et al. in U.S. Patent 2,047,398 or by Hanford in U.S. Patent 2,378,629 Generally, those copolymers containing combined maleic acids will be most readily produced by hydrolyzing the corresponding maleic anhydride copolymer. The maleamic acid copolymers may be prepared by reacting the corresponding maleic anhydride copolymer with a stoichiometrically equivalent quantity of gaseous ammonia, i.e., one mol of ammonia per mol of combined maleic anhydride. The use of excess gaseous ammonia will provide the ammonium salts of such maleamic or fumaramic acid copolymers. The ammonium salts may also be produced by the complete or partial neutralization of the acid copolymer with ammonium hydroxide or a water-soluble salt thereof with a weak acid such as ammonium acetate, ammonium citrate, etc.

The polyhydric alcohols employed in this invention are water-soluble alcohols containing at least 2 hydroxyl groups and include such compounds as the glycols, glycerine, mannitol, sorbitol, pentaerythritol, polyallyl alcohols, polyvinyl alcohols, etc. Examples of suitable glycols include trimethylene glycol, hexamethylene glycol, dimethylethylene glycol, ethylene glycol, polyethylene glycols, etc. The polyvinyl alcohols may be prepared by the partial hydrolysis of the corresponding polyvinyl acetate.

This invention is not limited to the use of any particular sand; rather, any conventional foundry sand may be employed. Acceptable sands are found in many parts of the world and vary substantially in particle size and shape, purity, clay content, etc. Therefore, when preparing foundry core and mold compositions, the optimum resin concentration and mixing time may vary somewhat depending upon the particular sand employed and properties desired.

The foundry core and mold compositions of this invention may be prepared according to conventional techniques. Depending on the core or mold strength required, from about 0.05–10% by weight of copolymer, based upon the sand, are employed. Foundry core compositions should contain from about 0.05–2% by weight of copolymer solids. Foundry mold compositions should contain from about 0.2–10% by weight of copolymer solids. The quantity of polyhydric alcohol employed varies from 2–40% by weight, based upon the weight of copolymer. Generally, at a given copolymer concentration, the greater the quantity of polyhydric alcohol employed, the greater will be the tensile strength of the completed core or mold.

The several components may be mixed by conventional means, e.g., mulling, etc. The superior stability of the water-soluble copolymers makes it especially advantageous to premix dry copolymer solids and the sand, storing the mixture for prolonged periods pending use. The polyhydric alcohol and from 1–10% of water by weight, based upon the sand, are added just prior to use. However, more conveniently, the water and the copolymeric binder are added to, and mixed with, the sand simultaneously. Generally, this is accomplished by adding to the sand an aqueous solution of the copolymeric binder, the relative proportions of copolymeric and water in the solution being such as to provide directly the desired proportions of water and binder in the mix. In another embodiment, the hot sand technique may be employed. In this method the copolymer and polyhydric alcohol are mixed with sand hot enough to cause fusion of the resin. The individual sand particles become coated with the resin providing moldings of high tensile strength upon cure.

The non-ammoniacal copolymers of this invention are excellently suited for use in the carbon dioxide process for preparing foundry cores and molds. In this process from about 1–10% by weight of a sodium silicate having a sodium silicate having a sodium oxide to silicon dioxide ratio of from about 1.8:1 to 2.7:1 is also added to the foundry core and mold composition. Curing is effected by shaping the foundry composition and passing compressed carbon dioxide through the mass for about 10–60 seconds.

Other conventional additives may optionally be incorporated into the foundry core and mold compositions of this invention, e.g., fillers, stabilizers and mold release agents. Chief among these are the mold release agents such as kerosene, fuel oil, waxes, etc. and mixtures thereof. If desired, other conventional binding agents may be employed in combination with the binders of this invention; e.g., cereals, phenolic resins, alkyd resins, linseed oil, etc.

Cores and molds are prepared from the compositions of this invention according to conventional techniques. However, these compositions are particularly advantageous in that they permit considerably shorter baking periods than heretofore obtainable. Complete cure can be obtained by heating at a temperature of from 200–450° F. for from 10–60 minutes. These compositions are also excellently suited for cure by dielectric heating techniques.

The foundry compositions of this invention are especiall advantageous in preparing cores for use in the casting of non-ferrous metals and alloys such as aluminum, brass, bronze, magnesium, etc. The cross-linked copolymeric binders are readily decomposed at the casting temperatures involved, forming only negligible quantities of gases. The core material is easily shaken from the casting as it is removed from the mold.

It is obvious that many variations may be made in the products and processes heretofore described without departing from the spirit and scope thereof.

What is claimed is:

1. A method for making foundry cores and molds which comprises preparing a mixture consisting essentially of foundry sand, water, from 0.05–10% by weight, based upon the sand, of a water-soluble copolymer and from 2–40% by weight, based upon the water-soluble copolymer, of a water-soluble polyhydric alcohol, shaping said mixture and heating at a temperature of from 200–450° F. to evaporate water and harden said mixture; said water-soluble copolymer being selected from the group consisting of interpolymers of (a) an ethylenically unsaturated carboxylic monomer selected from the group consisting of maleic acid, maleamic acid, fumaric acid, fumaramic acid and mixtures thereof and (b) an alkylene monomer containing from 2–4 carbon atoms, and the ammonium salts thereof; said water-soluble copolymer having a molecular weight equivalent to that of an ethylene-maleic anhydride copolymer having a specific viscosity of from 0.1–3.0 as measured at 25° C. on a 1% by weight solution thereof in dimethylformamide.

2. A method as in claim 1 wherein the water-soluble copolymer is an ammonium salt of an ethylene-maleic acid copolymer.

3. A method as in claim 1 wherein the water-soluble copolymer is an ammonium salt of an ethylene-maleamic acid copolymer.

4. A method as in claim 1 wherein the water-soluble polyhydric alcohol is glycerine.

5. A method as in claim 1 wherein the water-soluble copolymer is an ammonium salt of an ethylene-maleic acid copolymer and the water-soluble polyhydric alcohol is glycerine.

6. A method as in claim 1 wherein the water-soluble copolymer is an ammonium salt of an ethylene-maleamic acid copolymer and the water-soluble polyhydric alcohol is glycerine.

References Cited in the file of this patent

UNITED STATES PATENTS

| | | |
|---|---|---|
| 2,047,398 | Voss et al. | July 14, 1936 |
| 2,817,128 | Wickett | Dec. 24, 1957 |

FOREIGN PATENTS

| | | |
|---|---|---|
| 732,005 | Great Britain | June 15, 1955 |